United States Patent
Corbinelli et al.

(10) Patent No.: US 9,455,614 B2
(45) Date of Patent: Sep. 27, 2016

(54) METHOD FOR ALIGNING CONDUCTORS OF COIL MEMBERS

(75) Inventors: Rubino Corbinelli, Staggia Senese (IT); Massimo Ponzio, Tavernelle Val di Pesa (IT)

(73) Assignee: ATOP S.P.A., Barberino Val d'Elsa (IT)

( * ) Notice: Subject to any disclaimer, the term of this patent is extended or adjusted under 35 U.S.C. 154(b) by 82 days.

(21) Appl. No.: 13/982,138

(22) PCT Filed: Feb. 13, 2012

(86) PCT No.: PCT/EP2012/000633
§ 371 (c)(1),
(2), (4) Date: Sep. 20, 2013

(87) PCT Pub. No.: WO2012/119691
PCT Pub. Date: Sep. 13, 2012

(65) Prior Publication Data
US 2014/0007415 A1    Jan. 9, 2014

(30) Foreign Application Priority Data

Mar. 7, 2011 (IT) .............................. TO2011A0199

(51) Int. Cl.
*H02K 15/14* (2006.01)
*H02K 15/04* (2006.01)
*H02K 15/00* (2006.01)

(52) U.S. Cl.
CPC ...... *H02K 15/0428* (2013.01); *H02K 15/0031* (2013.01); *H02K 15/0068* (2013.01); *H02K 15/0087* (2013.01); *Y10T 29/49009* (2015.01); *Y10T 29/53143* (2015.01)

(58) Field of Classification Search
CPC ..................... H02K 15/0056; H02K 15/0081; H02K 15/0031; H02K 15/0068; H02K 15/0428

USPC ................... 29/596–598, 732–736, 605–606
See application file for complete search history.

(56) References Cited

U.S. PATENT DOCUMENTS

| 4,052,783 A | 10/1977 | Shively |
| 5,586,384 A | 12/1996 | Newman |

(Continued)

FOREIGN PATENT DOCUMENTS

| EP | 1 041 702 A2 | 10/2000 |
| EP | 1 043 828 A2 | 10/2000 |

(Continued)

OTHER PUBLICATIONS

WO2013/190860A1, stator manufacturing device and stator manufacturing method Dec. 27, 2013 PCT.*

(Continued)

*Primary Examiner* — Minh Trinh
(74) *Attorney, Agent, or Firm* — Cooley LLP

(57) ABSTRACT

Embodiments of disclosure include, for example, a method for aligning wire conductors of coil members of a core of an electric motor or generator for welding the ends thereof. Such methods may include providing a plurality of circumferentially arranged first passages and a plurality of circumferentially arranged second passages, where each first passage is overlapped with a second passage to form a pair, each pair of passages form a combined third passage. Such methods may further include moving at least one of the first plurality of passages and the second plurality of passages relative to one another to cause radial sides of the passages to engage and move the end portions of the wire conductors in the circumferential direction.

12 Claims, 4 Drawing Sheets

(56) References Cited

U.S. PATENT DOCUMENTS

| | | |
|---|---|---|
| 6,782,600 B2 | 8/2004 | Yamazaki |
| 7,370,401 B2 | 5/2008 | Stratico |
| 2002/0017585 A1 | 2/2002 | Haruta |
| 2003/0137207 A1 | 7/2003 | Tamura et al. |
| 2003/0159270 A1 | 8/2003 | Kato |
| 2003/0233748 A1* | 12/2003 | Gorohata ............... H02K 3/505 29/596 |
| 2004/0040142 A1 | 3/2004 | Hirota |
| 2005/0236509 A1 | 10/2005 | Burch |
| 2008/0148794 A1 | 6/2008 | Patterson |
| 2009/0249853 A1 | 10/2009 | Young |
| 2010/0325875 A1 | 12/2010 | Ponzio |

FOREIGN PATENT DOCUMENTS

| | | |
|---|---|---|
| EP | 1304789 A1 | 4/2003 |
| EP | 1 328 059 A2 | 7/2003 |
| EP | 1372242 A2 | 12/2003 |
| EP | 1 376 816 A2 | 1/2004 |
| EP | 1 727 260 A2 | 11/2006 |
| EP | 1 043 828 B1 | 9/2009 |
| FR | 2 845 536 A1 | 4/2004 |
| GB | 1 496 445 | 12/1977 |

OTHER PUBLICATIONS

International Preliminary Report on Patentability for International Application No. PCT/EP2012/000633, dated Sep. 10, 2013.

International Search Report for International Application No. PCT/EP2012/000633, date of completion of report Mar. 29, 2012.

Search Report and Written Opinion, completed Nov. 8, 2011, for IT TO2011A000199.

Search Report and Written Opinion, completed Feb. 2, 2012, for IT TO2011A000435.

International Search Report and Written Opinion, mailed Jan. 23, 2013, for International Application No. PCT/EP2012/002055.

\* cited by examiner

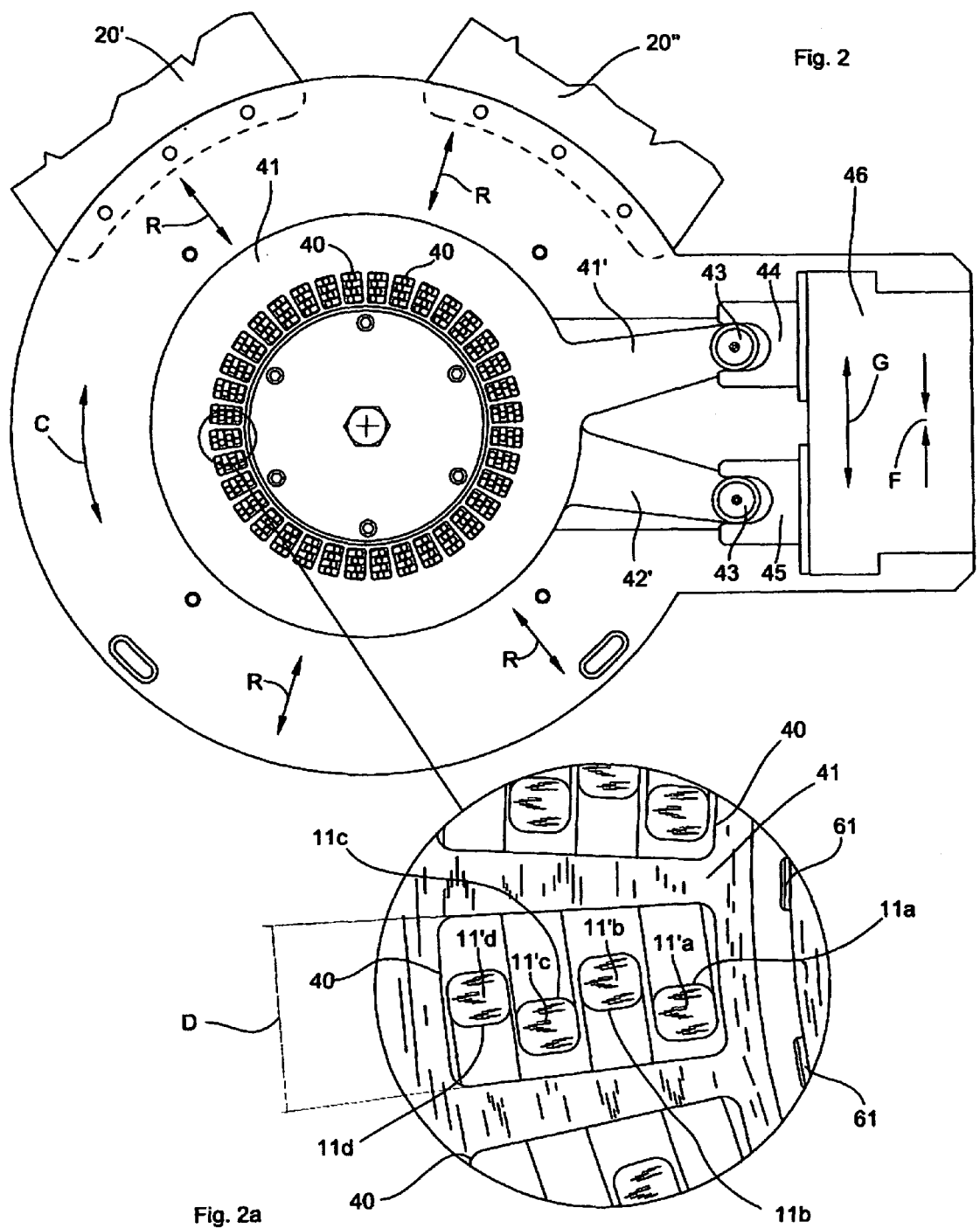

METHOD FOR ALIGNING CONDUCTORS OF COIL MEMBERS

CROSS REFERENCE TO RELATED APPLICATIONS

The present application is a 35 U.S.C. §371 national stage entry of PCT/EP2012/000633, which has an international filing date of Feb. 13, 2012 and claims priority to Italian Patent Application Serial No. TO2011A000199, filed on Mar. 7, 2011. The present application incorporates herein by reference the disclosures of each of the above-referenced applications in their entireties.

BACKGROUND OF THE INVENTION

The present invention relates to apparatuses and processes adapted to weld together the ends of a pair of conductors, wherein each conductor belongs to a coil member having a fork-like shape. Said members are inserted in slots of a core of an electric dynamo machine, and are normally referred to as "hairpins" in the art.

The hairpin has two straight legs connected together by a bridge-like transversal part. As a whole, the hairpin somewhat looks like an upside-down "U", with the bridge having a cusp-like shape. Each leg has a free end for inserting the hairpin into the slots of a core, such as a stator or an armature.

The insertion is done by routing the free ends through the longitudinal entrances of the slots and by sliding them past the opposite side of the core, until the legs protrude outwards to a certain extent. Therefore, the hairpin bridges stay out on one side of the core, while the free ends stay out on the opposite side.

After having been inserted, the free ends are bent to be positioned in predetermined positions, where connections to other free ends are made by welding.

The present invention relates to apparatuses and processes for aligning the free ends along predetermined directions, so as to ensure that the free ends stay in predetermined positions prior to welding operations.

The welding operation can be carried out by resistance heating or through a laser beam that hits the heads of two free ends placed in adjacent positions in order to be connected. The material of both heads is thus melted and forms a connection joint having specified mechanic and electric characteristics, which closes the winding circuit of the core in accordance with a predetermined electric scheme.

A welding apparatus wherein the free ends are welded together by using an electric current for melting the material thereof is disclosed in European patent publication no. 1,043,828.

For the latest core applications, e.g. stators of electric motors or generators, the apparatuses and processes for free-end alignment have been refined in order to ensure greater accuracy in the positioning of the free ends prior to welding.

In addition, the devices involved in the alignment process must take less room and must apply a greater straightening force onto the conductors to align them, without damaging the conductors' insulation.

The increased hourly production of these core components has led to a reduction in the time available for performing the welding operation, so that there is less time for carrying out the alignment of the free ends.

OBJECT OF THE INVENTION

It is therefore one object of the invention to align the free ends of the hairpins while minimizing the risk that the alignment with the welding tool is not accurate.

It is another object of the invention to maintain the free ends in the proper position during and after the alignment step for performing the welding operation.

It is a further object of the present invention to carry out the alignment quickly for a large number of free ends.

It is yet another object of the present invention to prevent the conductors from being damaged by excessive alignment stresses.

Said objects are achieved by the present invention through an apparatus and a method according to the appended independent claims 1 and 10 for aligning wire conductors extending from portions of coil members inserted in the slots of a core of an electric dynamo machine to join the ends of the wire conductors by means of a welding operation.

Further preferred and advantageous features of the invention are set out in dependent claims.

BRIEF DESCRIPTION OF THE DRAWINGS

These and other objects and advantages of the invention will become apparent from the following detailed description, which is only provided by way of non-limiting example, with reference to the annexed drawings, wherein:

FIG. 2 is a scale view enlarged along the direction of arrows 2-2 of FIG. 1, which shows an alignment assembly positioned with respect to the free ends of a core, FIG. 2a is a magnified view of the area indicated in FIG. 2, FIG. 6 is a view from the direction 6 of FIG. 3a.

DETAILED DESCRIPTION OF THE INVENTION

Figure 1:
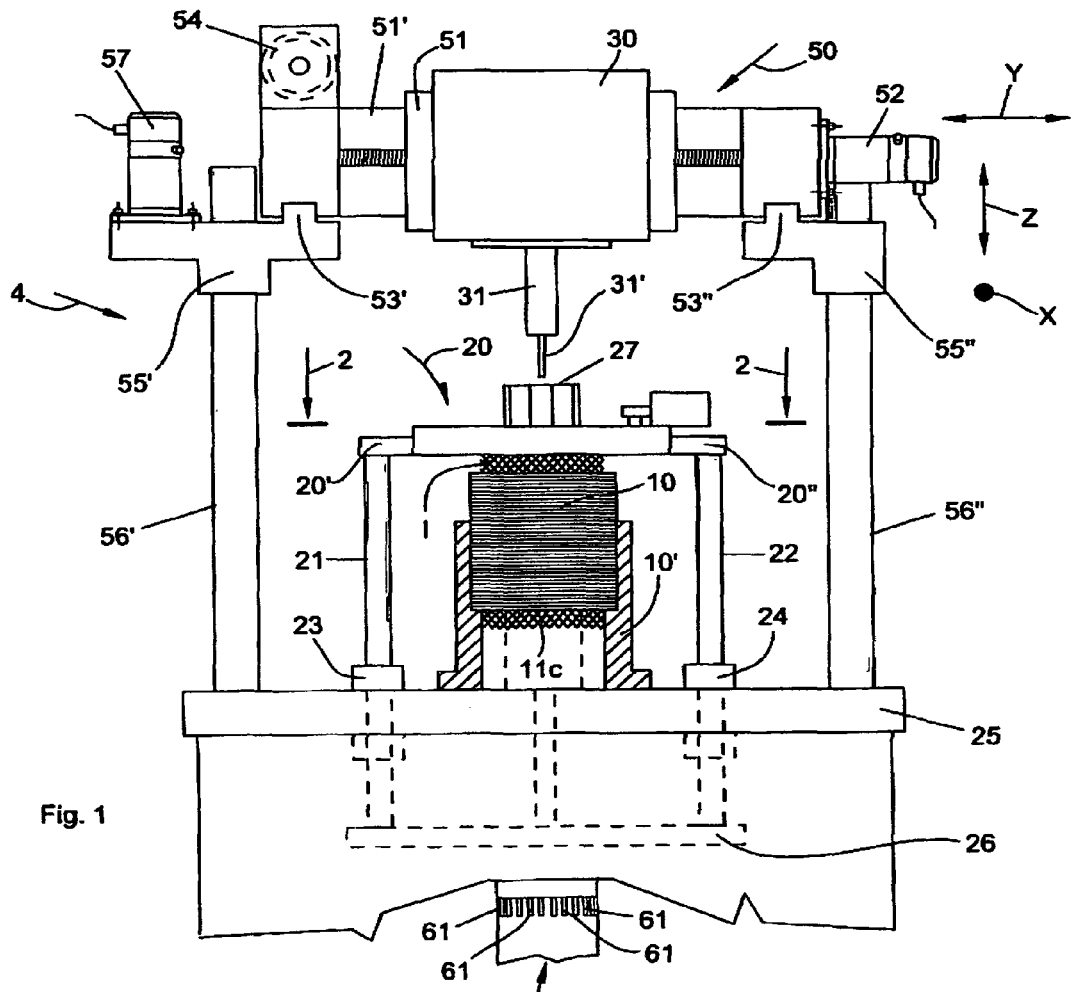
FIG. 1 is an elevation view of a welding machine equipped with an alignment assembly according to the principles of the invention.
Figure 1A:
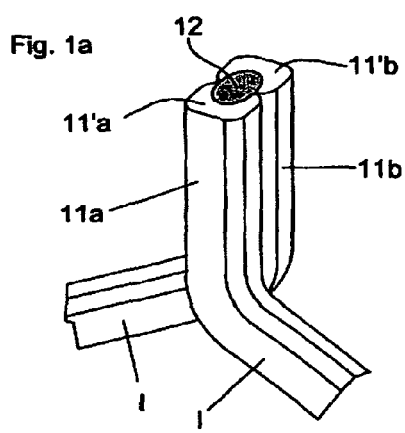
FIG. 1a is a perspective view in the direction 1a of FIG. 3a, which shows two welded free ends.
Figure 1B:
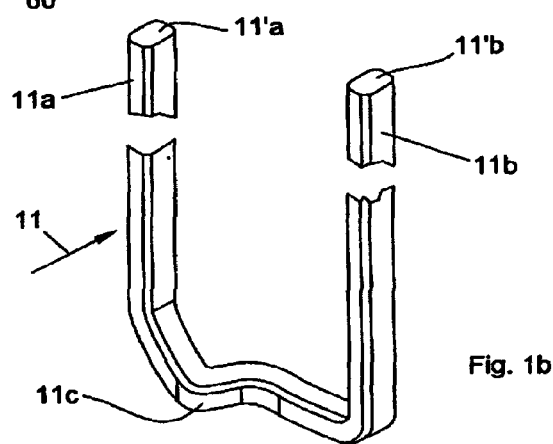
FIG. 1b is a perspective view similar to the view of FIG. 1a, which shows a hairpin before it is inserted into a core.

With reference to FIGS. 1, 1a, 1b, welding assembly 30 is equipped with a laser device 31, whose laser beam 31' is aligned with heads 11a' and 11b' of two end portions of the legs of hairpins. Said end portions of the legs will be referred to hereafter as free ends 11a and 11b (see FIG. 1a).

FIG. 1b shows a hairpin 11 before it is inserted into the core, the latter consisting of stator 10 of FIG. 1. The hairpin has two free ends 11a and 11b belonging to respective legs joined together by bridge 11c.

FIG. 1a shows two free ends 11a and 11b of two different hairpins after they have been inserted into the stator and bent in order to make weld 12, consisting of melted material.

In fact, FIG. 1a shows that, because of the bending, a portion of legs I is inclined as needed to reach the position where free ends 11a, 11b are arranged in order to align heads 11'a and 11'b thereof for welding.

In FIG. 1, all the free ends of stator 10 are hidden by the external part of alignment assembly 20, whereas the interlacement of hairpin bridges 11c is visible at the bottom of stator 10.

Under alignment assembly 20, close to the top side of stator 10, one can see the interlacement of inclined portions I of the legs.

For welding, stator 10 is placed into seat 10' (shown as a cross-section) of frame table 25 to be aligned with alignment assembly 20 and welding assembly 30.

Welding assembly 30 is carried by drive assembly 50, which moves welding assembly 30 in both directions of X axis (perpendicular to the plane of the sheet that contains FIG. 1), in both directions of Y axis, and in both directions of Z axis.

In order to accomplish the movements in X,Y,Z axes, drive assembly 50 is fitted with a slide 51, which carries welding assembly 30. Slide 51 is moved in both directions of Y axis by motor 52. Slide 51 slides on a crosspiece 51', which can move along guides 53' and 53" in both directions of X axis. The crosspiece is moved in both directions of X axis by motor 54.

Guides 53' and 53" are supported by slides 55' and 55", which can move along guides 56' and 56" in both directions of Z axis. Slides 55' and 55" are moved in both directions of Z axis by motor 57.

By sending suitable commands to motors 52,54,57 of drive assembly 50, it is possible to align and position laser beam 31' with heads 11'a and 11'b in order to make welds 12. The man skilled in the art may of course adopt welding means other than laser ones without departing from the application scope of the principles of the present invention.

Alignment assembly 20 has two support arms 20' and 20" connected to the heads of shafts 21 and 22, respectively. Shafts 21 and 22 can move in both directions of Z axis on guides 23 and 24 of frame table 25. Shafts 21 and 22 are connected to each other by crosspiece 26 (drawn with a dashed line in FIG. 1). The stem of cylinder 27 is connected to crosspiece 26 to move shafts 21 and 22 in both directions of Z axis, and thus move alignment assembly 20 in both directions of Z axis as well.

The position of alignment assembly 20 along Z axis near the end of stator 10, as shown in FIG. 1, causes the alignment assembly to receive the free ends within alignment windows 40, as shown in FIGS. 2-6.

More specifically, with reference to FIGS. 2-6, there are a series of alignment windows 40 on a ring 41 and a second series of windows 40' on a second ring 42, which is assembled adjacent to ring 41. Ring 42 is hidden by ring 41 in FIGS. 2 and 3; ring 42 is visible in FIGS. 3a, 4, 5 and 6.

Alignment windows 40 and 40" of the two rings 41,42 have the same configuration. In FIG. 2, alignment windows 40 and 40' are perfectly aligned in pairs, thus forming through passages that can receive free ends like free ends 11a, 11b, 11c, 11d, shown in the magnified detail of FIG. 2a. Reception occurs when the alignment assembly is brought near the stator, and when the latter is angularly aligned in seat 10' to allow free ends such as 11a, 11b, 11c, 11d to get into the matching pairs of windows 40 and 40', as shown in FIGS. 1 and 2.

Figures 3, 3A:
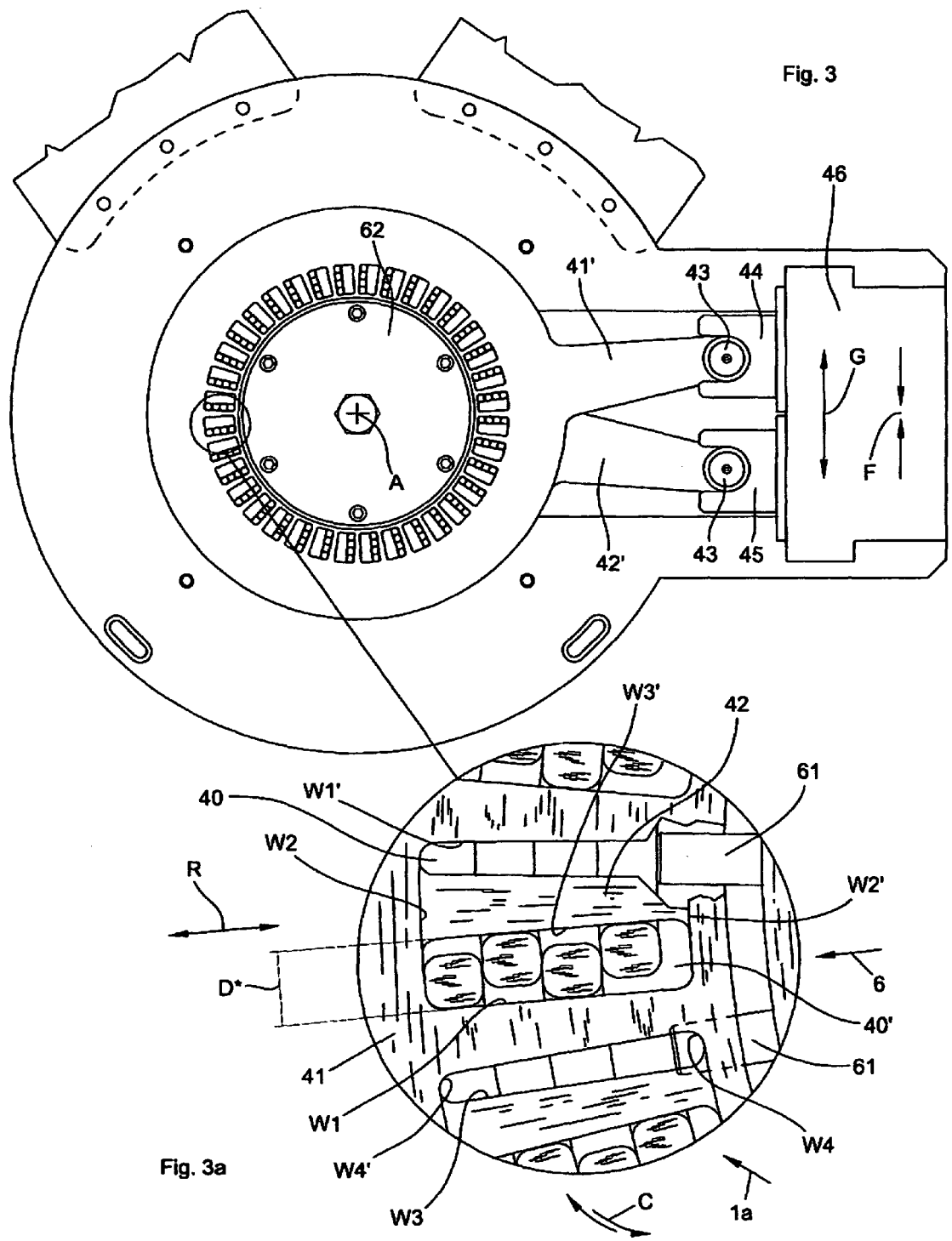
FIG. 3 is a view similar to the view of FIG. 2, which shows a step wherein the free ends have been aligned.
FIG. 3a is a magnified view of the area indicated in FIG. 3.

The number of alignment windows 40 of a series of a ring may equal the number of slots in the stator, as shown in the example of FIGS. 2 and 3.

In the drawings, four legs of hairpins 11 are present in one slot of the stator; hence four free ends 11a, 11b, 11c and 11d are received in each passage formed by alignment windows 40 and 40' when they are aligned (i.e. matched in pairs) and when alignment assembly 20 has approached the core, as shown in FIGS. 1 and 2. Alignment assembly 20 is made to approach the core by actuating cylinder 27 and then moving crosspiece 26 in order to move shafts 21 and 22 along Z axis towards table 25.

It is apparent from FIG. 2a that free ends 11a, 11b, 11c and 11d, when received in a single passage, have heads, such as 11'a,11'b,11'c,11'd, which are not aligned with respect to the working direction of a welding tool, such as beam 31' of laser device 31.

As shown in FIGS. 2 and 3, rings 41 and 42 have respective control arms 41' and 42'; at the end of each arm an idle roller 43 is mounted. Roller 43 of arm 41' is housed in the seat of actuator member 44, whereas roller 43 of arm 42' is housed in the seat of actuator member 45. Members 44 and 45 are moved towards each other in direction F and away from each other in directions G by actuator assembly 46.

With reference to FIGS. 2 and 3, when movement occurs in directions F, ring 41 rotates clockwise in circumferential direction C about central axis A, and ring 42 moves about A axis to the same angular extent in the opposite circumferential direction C.

The rotations in directions C bring about the alignment condition shown in FIGS. 3 and 3a.

More in particular, with reference to FIG. 3a, one may consider that one window 40 of ring 41 is made up of opposite faces W1 and W1' facing in circumferential directions C of the stator and of opposite faces W2 and W2' facing in radial directions R of the stator.

Likewise, a window 40' of ring 42 may be made up of opposite faces W3 and W3' facing in circumferential directions C and of opposite faces W4 and W4' facing in radial directions R.

It follows that the rotations in directions C move first ring 41 relative to second ring 42 in circumferential directions C to reduce distance D (FIG. 2 a) that separates opposite faces W1 and W3', respectively belonging to rings 41 and 42, facing in circumferential directions C (see condition shown in FIG. 3 a). The opposite faces like W1 and W3' engage and move the wire conductors of free ends 11a, 11b, 11c and 11d in circumferential directions C in order to reach the condition of alignment of free ends 11a, 11b, 11c and 11d in radial directions R, as shown in FIG. 3a.

The condition in which the opposite faces like W1 and W3' are close, i.e. separated by a distance D* in FIG. 3, is such that a certain margin of play is left between faces W1 and W2 and free ends 11a, 11b, 11c and 11d. This play allows the conductors forming the free ends to move in radial direction R, as will be described below. It follows that the conductor portions forming free ends 11a, 11b, 11c, 11d are not clamped by faces W1 and W3', so that at this stage they are not retained in the radial direction R.

Figure 4:
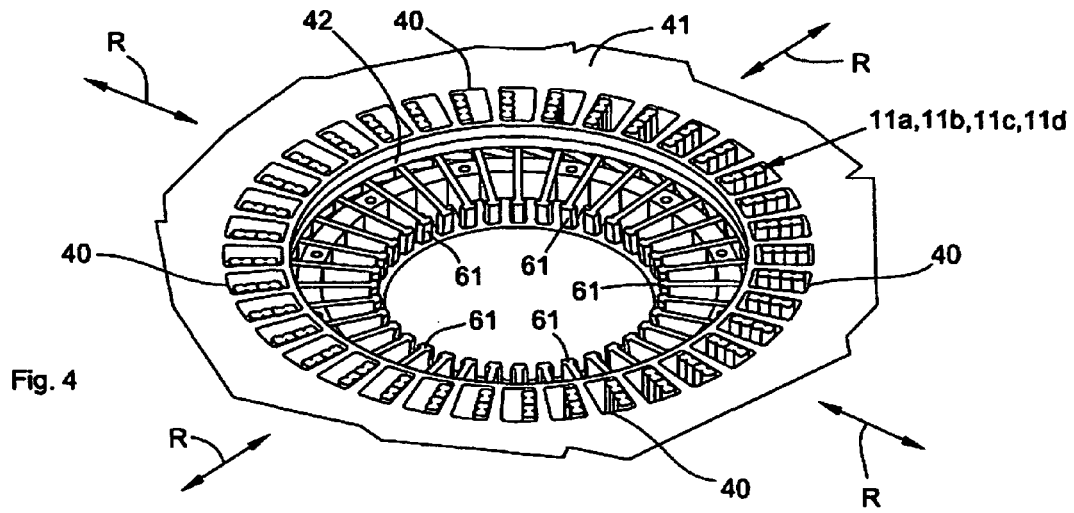
FIG. 4 is a partial perspective view along the direction 4 of FIG. 1, which shows the alignment assembly according to the principles of the invention.

With particular reference to FIGS. 3a, 4, 5, 6, pusher assembly 60 can be aligned inside the stator in a manner such that push blades 61 are aligned with inclined portions I of the legs (see FIG. 4). In this alignment situation, a movement of blades 61 in radial directions R, outwards from the stator, causes radial blades 61 to contact and push in the same direction inclined portions I.

As a result, free ends 11a, 11b, 11c and 11d located in a narrow passage at a distance D*, like the one shown in FIGS. 3a, 4, 5 and 6, are pushed one against the other, outermost one 11d being pushed in contact with the surface of faces W2 and W4' (see FIGS. 5 and 6) of two windows 40 and 40', which have been relatively rotated in circumferential directions C.

The free ends, like 11a, 11b, 11c and 11d, are thus aligned and retained in predetermined positions and directions with respect to the central A axis, as needed to ensure an accurate positioning prior to welding.

The rotations in directions C, which relatively move first ring 41 with respect to second ring 42 in order to reduce distance C to distance D*, can simultaneously align free ends 11a, 11b, 11c and 11d present in all of the passages of rings 41 and 42. In fact, all opposite faces like W1 and W3' of various windows 40 and 40' will engage and move the various free ends in circumferential directions C, resulting in a condition wherein a plurality of free ends 11a, 11b, 11c and 11d are aligned along circumferential directions C of the stator (see FIGS. 3 and 4).

Figure 5:
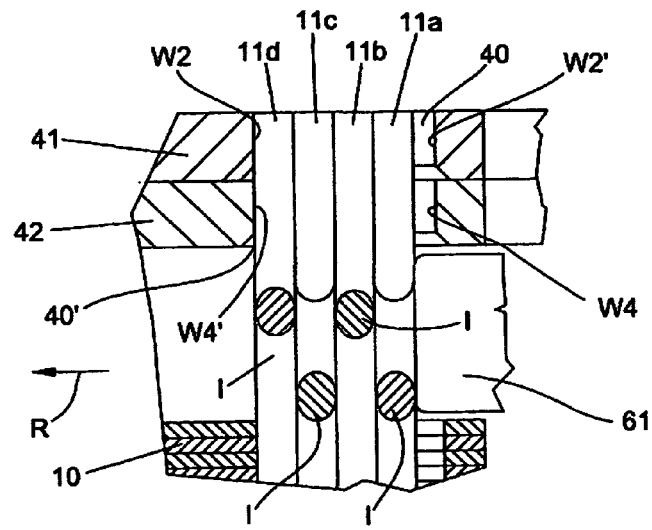
FIG. 5 is an elevation view from the directions 5-5 of FIG. 6.
Figure 6:
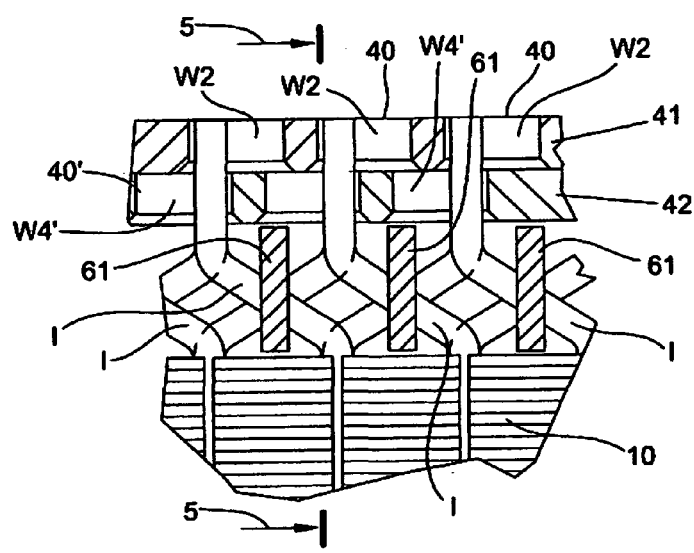

As soon as this condition is achieved, the multiplicity of blades 61 will push inclined portions I aligned in radial directions R, resulting in free ends 11a, 11b, 11c and 11d in the various narrow passages being pushed one against the other, outermost free ends 11d being pushed in contact with surfaces W2 and W4' of the various windows (FIGS. 4-6).

In FIG. 4 cover 62 of the pusher assembly 60, visible in FIG. 3, has been removed in order to provide a clearer view of blades 61 and their arrangement about A axis. Blades 61 can be moved in radial directions R by means of an inclined-slot solution like the one described in European patent 1,304,789, used for moving pushers in the radial directions of a stator for the purpose of forming the coil heads.

FIGS. 5 and 6 illustrate how ends 11a,11b,11c,11d are clamped by applying radial force near heads 11'a,11'b,11'c, 11'd. This ensures that, in order to obtain the same alignment bending, less force needs to be applied onto the conductors. Furthermore, the conductors are clamped near the welding region, thus ensuring a more stable and accurate positioning with respect to the welding tool.

The fact that the windows allow some play on the conductors when they are closed at distance D* ensures that no uncontrolled force is applied along the insulation of the conductors forming free ends 11a,11b,11c,11d.

With just one relative rotation of rings 41 and 42 it is possible to quickly align the plurality of free ends 11a,11b, 11c,11d in circumferential directions C.

Likewise, a single movement of the actuator of radial blades 61 will cause the plurality of blades 61 to move simultaneously to rapidly obtain the alignment of the plurality of free ends 11a,11b,11c,11d in radial directions R.

The fact that the windows are made to receive free ends 11a,11b,11c,11d through a movement of assembly 20 in direction Z towards the table, thus sliding for a short distance along the conductors, is useful to reduce the time required for aligning free ends 11a,11b,11c,11d and to avoid damage to the conductors.

The above description of one specific embodiment has illustrated the invention from a conceptual viewpoint, so that others, by using prior-art techniques, will be able to modify and/or adapt said specific embodiment to various applications without further research and without departing from the inventive concept. It is therefore understood that any such modifications and adaptations will be considered to be equivalent to the exemplary embodiment described herein. The means and materials necessary for implementing the various functions described herein may vary without departing from the scope of the invention. It is understood that the expressions and terminology used herein are merely descriptive and hence non-limiting.

The invention claimed is:

1. A method for aligning wire conductors of coil members of a core of an electric motor or generator for welding the ends thereof, the method comprising:
   providing a plurality of circumferentially arranged first passages and a plurality of circumferentially arranged second passages, wherein:
      each first passage is overlapped with a second passage to form a pair,
      each pair of passages form a combined third passage, and
      each third passage is configured to receive at least one end portion of at least two wire conductors of a coil member of the electric motor or generator;
   and
   moving at least one of the first plurality of passages and the second plurality of passages relative to one another in the circumferential direction of the core of the electric motor or generator to cause radial sides of the passages to engage and move the end portions of the wire conductors in the circumferential direction.

2. The method according to claim 1, further comprising forcing at least a portion of the wire conductors in the radial direction of the core to cause the end portions of the wire conductors in the third passage to engage each other in the radial direction.

3. The method according to claim 1, wherein the providing step further comprises providing one or more blades, and wherein forcing is accomplished through the action of one or more blades.

4. The method according to claim 3, wherein the one or more blades force portions of the wire conductors in the radial direction by pushing on inclined portions of the wire conductors.

5. The method according to claim 1, wherein the first passages are delimited by opposed radially positioned sides facing in circumferential directions of the core and by opposed circumferential sides facing in radial directions of the core, and wherein the second passages are delimited by opposed radially positioned sides facing in circumferential directions of the core and by opposed circumferential sides facing in radial directions of the core.

6. The method according to claim 5, wherein radial sides of the passages are configured to engage the end portions of the conductors within the passages in the circumferential direction.

7. The apparatus according to claim 5, wherein circumferential sides of the passages are configured to engage the most distant wire conductors positioned in a respective passage in the radial direction.

8. The method according to claim 1, further comprising welding the end portions of a pair of wire conductors positioned in the third passage.

9. The method according to claim 1, wherein at least four end portions of wire conductors are positioned in the third passage and the wire conductors are joined in pairs at their ends by a welding operation.

10. The method according to claim 1, further comprising relatively moving the core relative to the first passages and the second passages parallel to a longitudinal axis of the core to receive respective end portions of the wire conductors in the third passages.

11. The method according to claim 1, wherein the third passages become narrower when the plurality of first passages and plurality of second passages are moved relative to one another in the circumferential direction.

12. A wire conductor alignment method for aligning wire conductors of coil members provided in a core of an electric motor or generator for welding the ends thereof, the method comprising:
   providing a first member having a plurality of passages and a second member having a plurality of passages, wherein:
      the first member and second member are assembled adjacent to each other to align in pairs the passages of the first member with the passages of the second member; and
      each pair of aligned passages together forming a third passage capable of receiving the end portions of at least two wire conductors;
   relatively moving the first member with respect to the second member in the circumferential direction of the core of the electric motor or generator to cause the sides of the passages to engage and move the end portions of the wire conductors in the circumferential direction; and
   forcing, in a radial direction of the core, at least a portion of the wire conductors to cause the end portions of wire conductors present in the third passage to engage each other in the radial direction.

* * * * *